US006572470B1

(12) United States Patent
Famularo

(10) Patent No.: US 6,572,470 B1
(45) Date of Patent: Jun. 3, 2003

(54) APPARATUS AND METHOD FOR PLAYING A CARD GAME

(75) Inventor: Kevin James Famularo, 186 Bourke Street, Darlinghurst, New South Wales 2010 (AU)

(73) Assignees: Kevin James Famularo, New South Wales (AU); Peter Andrew Biro, New South Wales (AU)

( * ) Notice: Subject to any disclaimer, the term of this patent is extended or adjusted under 35 U.S.C. 154(b) by 76 days.

(21) Appl. No.: 09/763,036

(22) PCT Filed: Jun. 16, 2000

(86) PCT No.: PCT/AU00/00675

§ 371 (c)(1), (2), (4) Date: Apr. 17, 2001

(87) PCT Pub. No.: WO00/78420

PCT Pub. Date: Dec. 28, 2000

(30) Foreign Application Priority Data

Jun. 17, 1999 (AU) ............................................. PQ2119

(51) Int. Cl.[7] ............................................. A63F 13/00
(52) U.S. Cl. ............................................. 463/13; 463/26
(58) Field of Search ............................. 463/13, 20, 26; 273/292, 293, 303

(56) References Cited

U.S. PATENT DOCUMENTS 5,401,023 A 3/1995 Wood .......................... 463/13
5,511,781 A 4/1996 Wood et al. .................. 463/13
5,806,855 A * 9/1998 Cherry ........................ 273/292
5,839,731 A * 11/1998 Feola .......................... 273/292
6,206,373 B1 * 3/2001 Garrod ........................ 273/292
6,248,016 B1 * 6/2001 Walker et al. ................ 463/13
6,270,405 B1 * 8/2001 Ferguson ...................... 463/13
6,416,407 B1 * 7/2002 Carrico et al. ................ 463/13

* cited by examiner

*Primary Examiner*—Tony M. Argenbright
(74) *Attorney, Agent, or Firm*—Merchant & Gould P.C.

(57) ABSTRACT

A method is disclosed for playing a virtual card game on a computer with one or more players. The method involves providing a central processing unit programmed to define a virtual deck of cards and a predefined set of game criteria which a given hand must achieve in order to win. The computer allows a plurality of hands of cards to be drawn from the deck and determines if any players have achieved a win. A betting value is also established for each hand and players can repeat, optionally be betting, drawing cards from the deck until at least one hand achieves a win.

27 Claims, 14 Drawing Sheets

FIG.5

Hand Details

Cards: 40

Total Rating: 10.425

| Hand | Type | Shots | Avail | Formula | Leader Bonus | Bonus | Penalty | Score | Chances | Rating | Odds | Leader |
|---|---|---|---|---|---|---|---|---|---|---|---|---|
| 1 | 1 Pair | 3 | 2 | 24 | 0 | 0 | 0 | 30 | 54 | 1.35 | 5-1 | Y |
| 2 | 1 Pair | 3 | 2 | 24 | 0 | 0 | 0 | 30 | 54 | 1.35 | 5-1 | N |
| 3 | Single | 4 | 3 | 48 | 0 | 0 | 0 | 5 | 53 | 1.325 | 11-2 | N |
| 4 | 1 Pair | 3 | 2 | 24 | 0 | 0 | 0 | 30 | 54 | 1.35 | 5-1 | N |
| 5 | Single | 4 | 3 | 48 | 0 | 0 | 0 | 5 | 53 | 1.325 | 11-2 | N |
| 6 | Pos Dbl End Straight | 1 | 6 | 24 | 0 | 83 | 0 | 42 | 149 | 3.725 | 5-4 | N |

FIG.7

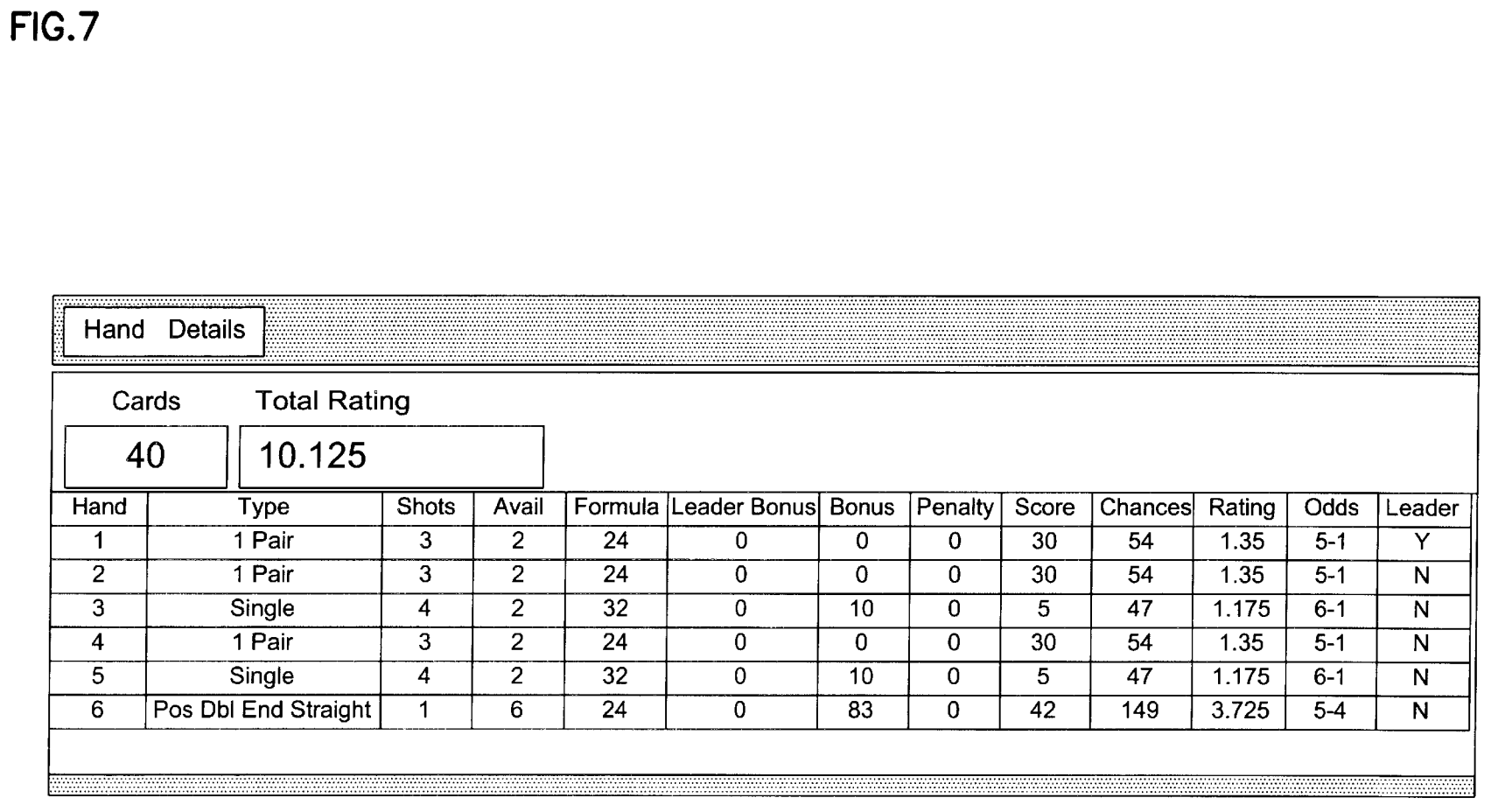

Hand Details

| Cards | Total Rating |
|---|---|
| 40 | 10.125 |

| Hand | Type | Shots | Avail | Formula | Leader Bonus | Bonus | Penalty | Score | Chances | Rating | Odds | Leader |
|---|---|---|---|---|---|---|---|---|---|---|---|---|
| 1 | 1 Pair | 3 | 2 | 24 | 0 | 0 | 0 | 30 | 54 | 1.35 | 5-1 | Y |
| 2 | 1 Pair | 3 | 2 | 24 | 0 | 0 | 0 | 30 | 54 | 1.35 | 5-1 | N |
| 3 | Single | 4 | 2 | 32 | 0 | 10 | 0 | 5 | 47 | 1.175 | 6-1 | N |
| 4 | 1 Pair | 3 | 2 | 24 | 0 | 0 | 0 | 30 | 54 | 1.35 | 5-1 | N |
| 5 | Single | 4 | 2 | 32 | 0 | 10 | 0 | 5 | 47 | 1.175 | 6-1 | N |
| 6 | Pos Dbl End Straight | 1 | 6 | 24 | 0 | 83 | 0 | 42 | 149 | 3.725 | 5-4 | N |

FIG.10

Hand Details

| Cards | Total Rating |
| --- | --- |
| 36 | 14.6388888888889 |

| Hand | Type | Shots | Avail | Formula | Leader Bonus | Bonus | Penalty | Score | Chances | Rating | Odds | Leader |
| --- | --- | --- | --- | --- | --- | --- | --- | --- | --- | --- | --- | --- |
| 1 | 1 Pair | 3 | 2 | 24 | 0 | 0 | 0 | 30 | 54 | 1.5 | 7-1 | N |
| 2 | 1 Pair | 3 | 2 | 24 | 0 | 0 | 0 | 30 | 54 | 1.5 | 7-1 | N |
| 3 | Single | 4 | 2 | 32 | 0 | 10 | 0 | 5 | 47 | 1.3055 | 8-1 | N |
| 4 | 3 of a kind | 2 | 1 | 8 | 0 | 0 | 0 | 115 | 123 | 3.4166 | 5-2 | Y |
| 5 | Pos Flush | 1 | 6 | 24 | 0 | 83 | 0 | 46 | 153 | 4.25 | 7-4 | N |
| 6 | Pos Dbl End Straight | 1 | 4 | 16 | 0 | 38 | 0 | 42 | 96 | 2.6666 | 7-2 | N |

APPARATUS AND METHOD FOR PLAYING A CARD GAME

FIELD OF THE INVENTION

The invention relates to an apparatus and method for playing a card game.

BACKGROUND OF THE INVENTION

Card games are a very popular form of entertainment and are sometimes played for money by players known as gamblers or "punters". Cards may also be played for social relaxation purposes.

There are a number of card games which can be played for money, and examples of these games include bridge, poker, blackjack and euchre. Typically such games are often played with five or six people.

Card games played for monetary gain are often played through regulated gambling organisations, such as in licensed casinos. However, in recent years with the emergence of the Internet, a number of web sites have been developed which facilitate the ability for punters to gamble on line.

Additionally, gambling with card games, can also be facilitated using machines which are provided with computer chips that simulate "virtual" card games such as poker, on a display. Such devices are known colloquially as "pokie" machines.

Pokie machines allow a punter to wager money by inserting money into a slot provided in the machine, afterwhich the punter then pushes a button to randomly draw a hand of virtual cards. If the draw is a winning combination of cards, then the punter receives money from the machine, otherwise the money wager is kept by the machine.

Pokie machines usually does not allow the player to have an option to choose which of a range of different hands, they would like to wager money on and hence such machines do not test a punter's ability to estimate which combination of cards is likely to generate a win.

The applicant does not concede that the prior art discussed in this specification forms part of the common general knowledge in the art at the priority date of this application.

SUMMARY OF THE INVENTION

It is an object of the invention to provide a virtual card game that may provide an enjoyable playing experience to one or more players.

According to a first aspect of the present invention, there is provided a method for playing a virtual card game on a computer, with one or more players, the method including the steps of:

(A) providing a central processing unit having;

(i) means to define a virtual deck of cards:

(ii) means to set up a series of quality combinations according to a predefined set of game criteria which a given hand must achieve in order to win, each hand comprising a predetermined number of cards;

(iii) means to deal from the deck, a plurality of hands of cards;

(iv) means to determine whether any hand has achieved a quality combination, and if not, assessing for each hand, which cards in that hand best assist the hand in achieving one or more of said quality combinations;

(v) means to discard from each hand, the cards which do not assist in achieving one of the said quality combinations;

(vi) means to establish a betting value for each hand based on the likelihood of that hand achieving a said quality combination when the discarded cards are replaced with new cards from the deck;

(vii) means to replace the discarded cards for each hand;

(B) providing at least one display device connected to the central processing unit for displaying the plurality of hands to one or more of the players;

wherein, the steps (iii) to (vii) are repeated by the central processing unit until at least one hand achieves a quality combination.

Advantageously the method includes a further step of providing a bet input means connected to the central processing unit, for allowing the players to input a bet based on the betting value of one or more of the hands.

Optionally, a win based on the betting value is paid to those players which bet on the hand which achieves the highest value of these hands which achieve a quality combination, and in which the bets for the other hands collected from the players. In such an embodiment, the bet input means may be a display board having areas marked thereon, which represent each of the hands and on which a value of money can be placed.

A win based on the betting value may be paid to those players which bet on the hand which achieves a highest value of the plurality of hands based upon the quality combinations. The bets for the other hands may be collected from the players.

According to a second aspect of the present invention, there is provided an apparatus for playing a virtual card game with one or more players, the apparatus including:

(A) a central processing unit having;

(i) means to define a virtual deck of cards;

(ii) means to set up a series of quality combinations according to a predefined set of game criteria which a given hand must achieve in order to win, each hand comprising a predetermined number of cards;

(iii) means to deal from the deck, a plurality of hands of cards;

(iv) means to determine whether any hand has achieved a quality combination, and if not, assessing for each hand, which cards in that hand, best assist the hand in achieving one or more of said quality combinations;

(v) means to discard from each hand, the cards which do not assist in achieving one of the said quality combinations;

(vi) means to establish a betting value for each hand based on the likelihood of that hand achieving a said quality combination when the discarded cards are replaced with new cards from the deck;

(vii) means to replace the discarded cards for each hand;

(B) at least one display device connected to the central processing unit for displaying the plurality of hands to one or more of the players;

wherein, the means (iii) to (vii) are repeated by the central processing unit until at least one hand achieves a quality combination.

Advantageously the apparatus may include a bet input means connected to the central processing unit, for allowing the players to input a bet based on the betting value of one or more of the hands.

Optionally a win based on the betting value is paid to those players which bet on the hand which achieves the highest value of the plurality hands which achieve a quality combination, and in which the bets for the other hands collected from the players.

One or more players may be able to view the plurality of hands from their own display device which may be may be connected to the central processing unit via a computer network such as the Internet.

Preferably the discarded cards are returned to the deck prior to the deck betting value for each hand being established. The cards in the deck are preferably shuffled, that is, the portion of the cards in the deck is randomised, prior to cards being drawn from the deck at any stage.

The win may be calculated by multiplying the bet by the betting value.

The bets collected for the hands which do not win can be kept by a game facilitator. If however, there were no bets made by a player for the winning hand, then all bets are kept by the game facilitator.

A value of money may be used to place the bet, such as cash or money tokens, but could equally be a numerical value which may or may not be representative of actual money.

Advantageously the deck of cards consists of a visual representation of a pack of 52 playing cards of the type 2, 3, 4, 5, 6, 7, 8, 9, 10. Jack, Queen, King, and Ace and being of the following suites: spades, clubs, diamonds and hearts. The deck may comprise a plurality of such packs.

Advantageously the quality combinations for a particular hand includes any one of the following:

(1) any five cards in sequence and defined as a "straight"

(2) any five cards of the same suit and defined as a "flush"

(3) any five cards sequence of the same suit and defined as a "straight flush"

(4) three cards of the same kind and a pair and defined as a "full house"

(5) four cards of the same kind and defined as "four of a kind"

In a preferred embodiment, an Ace is not recognised as a one in a hand of cards, hence there is no straight set for a hand of cards comprising: Ace, 2, 3, 4, 5.

Preferably there are 2 to 8 hands for which a random selection of virtual cards is made at (iii). More preferably there are 6 hands for which a random selection of virtual cards is made at (iii).

Preferably each hand consists of five playing cards so that the game is closely akin to poker.

The display device would typically be a computer monitor, television screen or gaming machine display, a display on a mobile phone utilising a mobile phone browser or a PDA screen.

The bet input means may be a keyboard connected to the computer for the input of data, or it may be a button located on the cover of a gaming machine which represents a value of a bet.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIGS. 5, 7 and 10 show computer generated tables of data used to calculate the betting odds for each hand during a game according to the present invention;

DETAILED DESCRIPTION OF THE EMBODIMENTS

A preferred embodiment provides an apparatus for playing a virtual card game with one or more players. The apparatus includes a central processing unit (CPU) which has an application program programmed to define a virtual deck of cards. The application program has software to set up a series of quality combinations according to a predefined set of game criteria which a given hand from the virtual deck of cards, must achieve in order to win. Each hand includes a predetermined number of cards.

The application program allows a plurality of hands of cards to be dealt from the deck and after the hands have been dealt, determines whether any hand has achieved a quality combination, and if not, the application program assesses for each hand, which cards in that hand best assist the hand in achieving one or more of the quality combinations.

The application program then discards from each hand, the cards which do not assist in the particular hand in achieving one of the said quality combinations, and establishes a betting value for each hand based on the likelihood of that hand achieving a quality combination when the discarded cards are replaced with new cards from the deck. The application program replaces the discarded cards for each hand.

A display device is connected to the central processing unit via the Internet for displaying the plurality of hands to one or more players.

The application program enabled by the CPU, permits the repetition of dealing each hand; discarding each hand unwanted cards according to the quality criteria and replacing it with fresh cards from the pack until at least one hand achieves a quality combination.

A bet input means is also connected to the CPU to allow the players to input a bet based on the betting value of one or more of the hands and a win based on the betting value is paid to those players which bet on the hand which achieves the highest value of the plurality hands which achieve a quality combination, and in which the bets for the other hands collected from the players.

Figure 1:
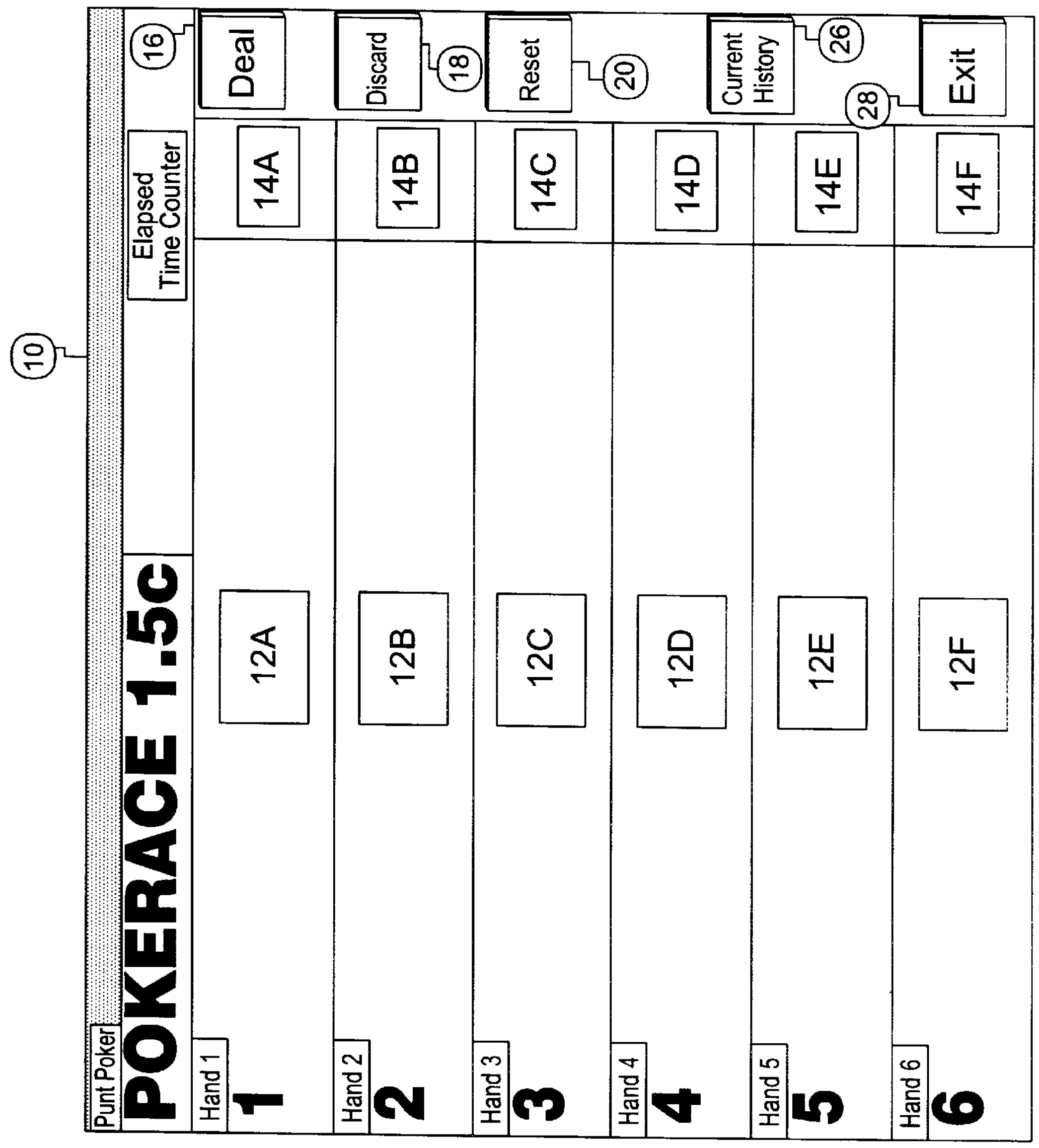
FIGS. 1–4, 6, 8–9, and 11–12 illustrate a screen display showing the various stages of a game being played in a preferred embodiment.

Referring now to FIG. 1, there is shown a graphic display for a playing card game run by the application program 32(refer to FIG. 13) located on a computer 34, before the cards are dealt in a card game of poker.

In this example of the invention, the display is split into six discreet regions (labelled as "Hand1, Hand2, . . . Hand6") and shown as regions 12A–F. Each of the regions 12A–F are provided to display a hand of 5 cards each, which are dealt from a pack of 52 playing cards.

The 52 playing cards consist of 2, 3, 4, 5, 6, 7, 8, 9, 10, Jack, Queen, King, and Ace, being of the following suites: clubs, hearts, spades and diamonds.

The regions 14A–F are located adjacent to the regions 12A–F respectively, and they are provided to display the betting odd value of each hand 1 to 6, which is calculated by a central processing unit within a computer (not shown).

Each hand of six cards is drawn from the 52 playing cards when a player clicks on the "Deal" icon 16 with the pointer of their mouse. The Deal icon 16 activates an application program held within the memory or a ROM chip of the computer, which randomly selects six hands from the 52 playing cards and displays each of the hands at each respective region 12A–F.

Below the Deal icon 16 is the "Discard" icon 18 which discards the particular cards from each hand according to a predefined set of rules within the computer. (as will be described below), after the cards have been Dealt and displayed in each of the display regions 12.

A reset icon 20 is located below the Discard icon 18, and is used by a game facilitator or player who wishes to restart a new game and clear the cards from the hand display region 12.

Below the reset icon 20 is a "Current History" icon 26 which shows the history of each hand during each deal which is made during the card game, in addition to an "Exit" icon 28 positioned at the bottom right hand corner of the display, which may be selected by a player or game facilitator to terminate the game.

Figure 2:
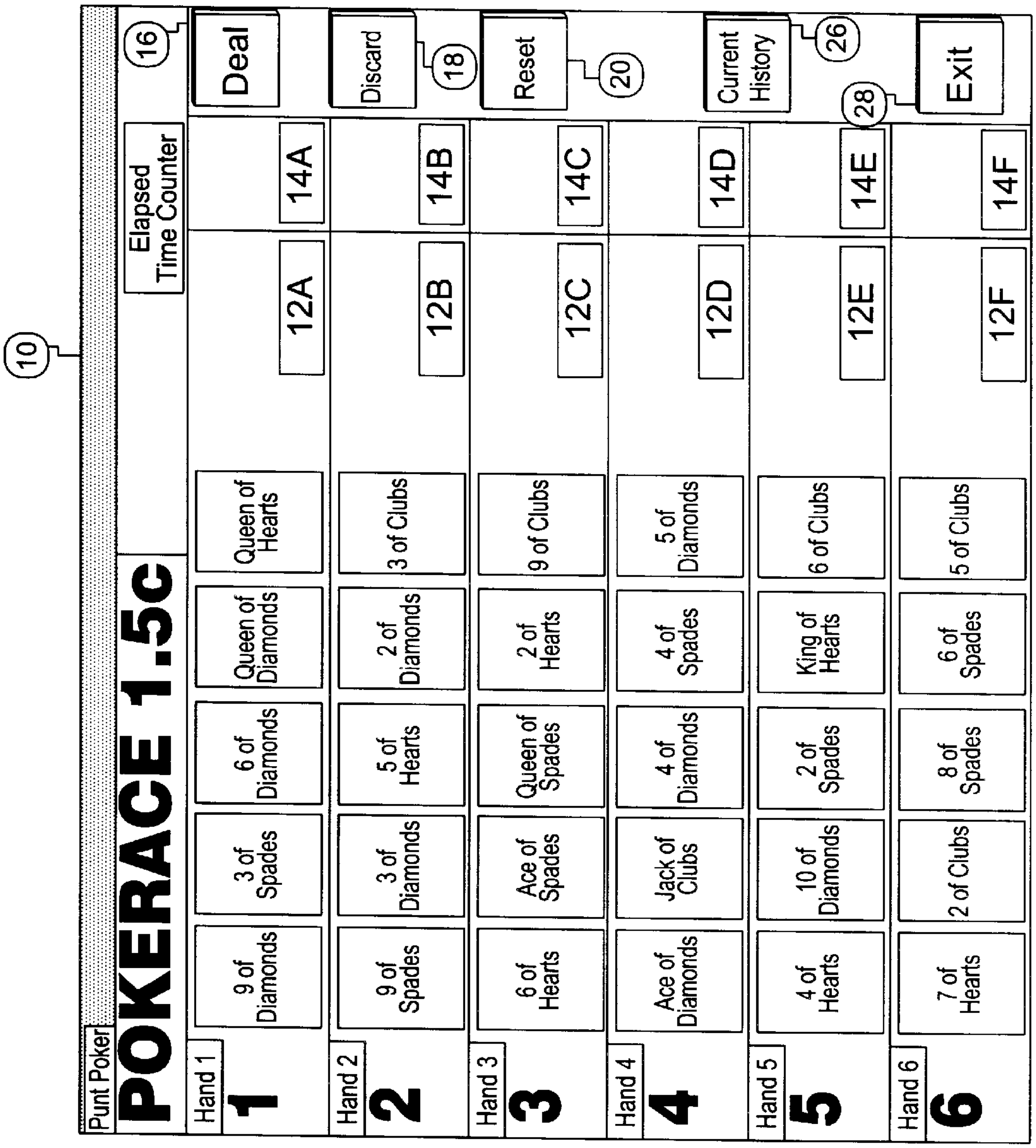

Now referring to FIG. 2, there is shown on the display button screen 10, six hands 12A–F, which have been drawn from the playing cards after a game facilitator has selected the Deal icon 16.

Figure 3:
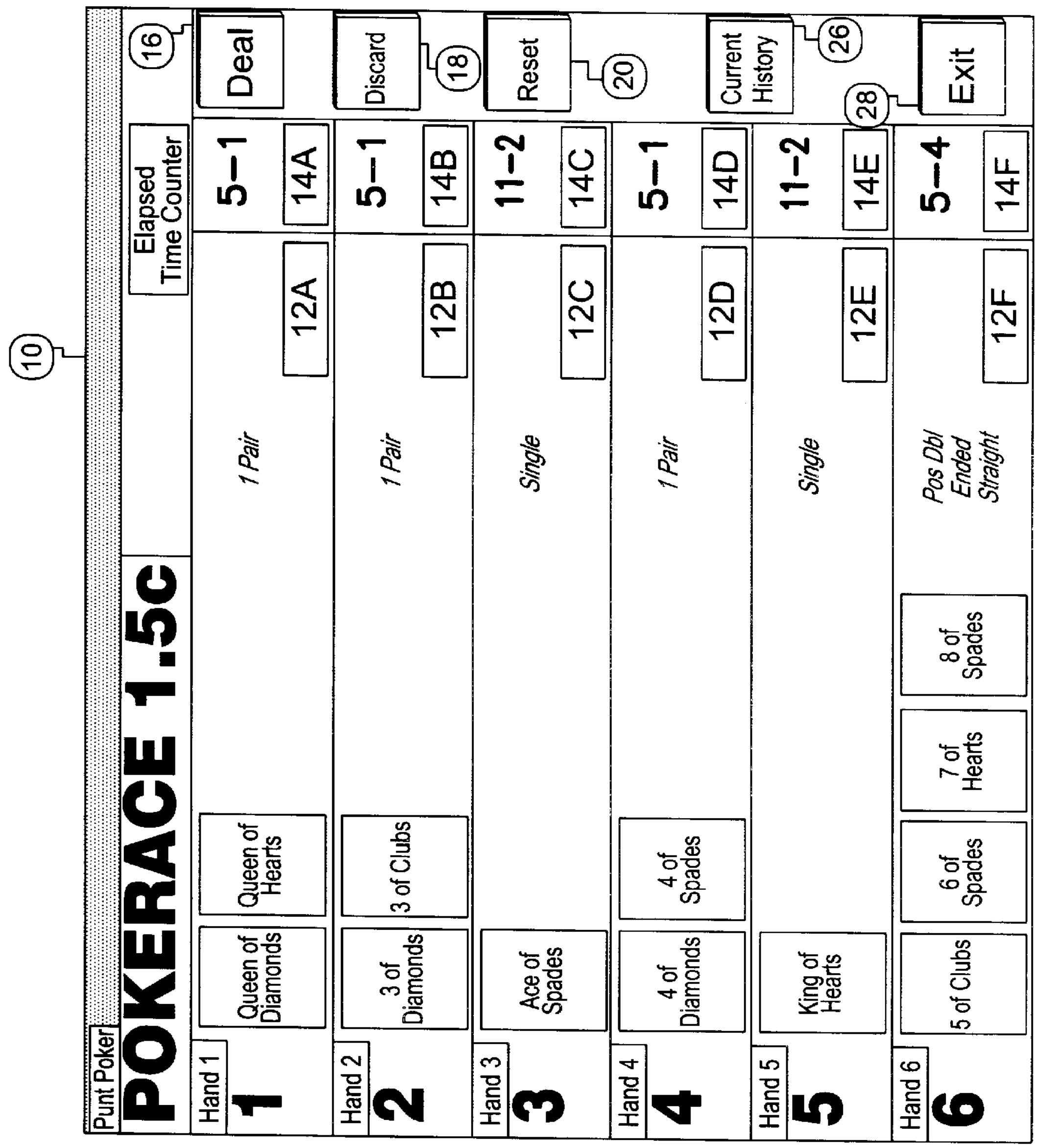

The game facilitator or a player then selects the Discard icon 18 and the screen changes to the screen showing in FIG. 3.

It can be seen that the software program has kept cards according to the set of predefined rules.

During each discarding step, those cards are discarded which do not contribute to a predefined level of quality for each hand. In this regard, for the game of the present invention, the requisite level of quality for a particular hand includes any one of the following combinations:

(1) any five cards in a sequence and defined as a "straight", such as a sequence of cards, 4, 5, 6, 7, 8;

(2) any five cards of the same suit and defined as a "flush", such as for example 3 of Clubs, 7 of Clubs, 10 of Clubs, Jack of Clubs, Queen of Clubs.

(3) any five cards sequence of the same suit as defined as a "straight flush", such as for example 8 of Hearts, 9 of Hearts, 10 of Hearts, Jack of Hearts, Queen of Hearts.

(4) any three cards of the same kind and a pair and defined as a "full house", such as 10, 10, 10, 2, 2 or (5) four cards of the same kind as defined "as four of a kind", such as, 6, 6, 6, 6.

Hence, the rules of the discarding step are defined within the application program such that for any hand, those cards will be discarded which do not assist a hand in reaching one of the requisite levels of quality. Furthermore, where there are no cards held in a hand which assist in the hand reaching the requisite level of quality, the highest value card types are kept.

The cards types are valued in increasing order as: 2, 3, 4, 5, 6, 7, 8, 9, 10, Jack, Queen, King, Ace.

In this regard, referring to FIG. 3, it can be seen that the pair of Queens in hand I are kept while the other cards have been discarded.

For hand2, the pair of 3s are kept and cards 2, 5 and 9 are discarded.

There are no pairs drawn in hand3, so the Ace of spades, being the highest valued type of card from the original hand drawn in hand 3 is kept and card types 2, 6, 9 and Queen are discarded.

A pair of 4s are kept in hand4 and a 5, Ace and Jack is discarded.

A King is kept in hand 5 being the highest card from the set of cards drawn in hand 5 and the cards 5, 6, 7 and 8 which are show in hand6, are kept as they may be a possible straight.

As can be seen on FIG. 3 each of the betting odd value regions 14A–F display an odd value calculated by the application program, according to a betting odd value method which shall be explained below.

Usually, when the game is being played using a personal computer, the input means is provided in the form of a keyboard (not shown), in which the players of the game submit a wager on one or more of the hands1–6, displayed to the players and for which they would like to place a wager. This information is then stored within the memory of the computer, which stores a record of the identity of the player and the amount he/she is wagering on the particular hand1–6.

Figure 4:
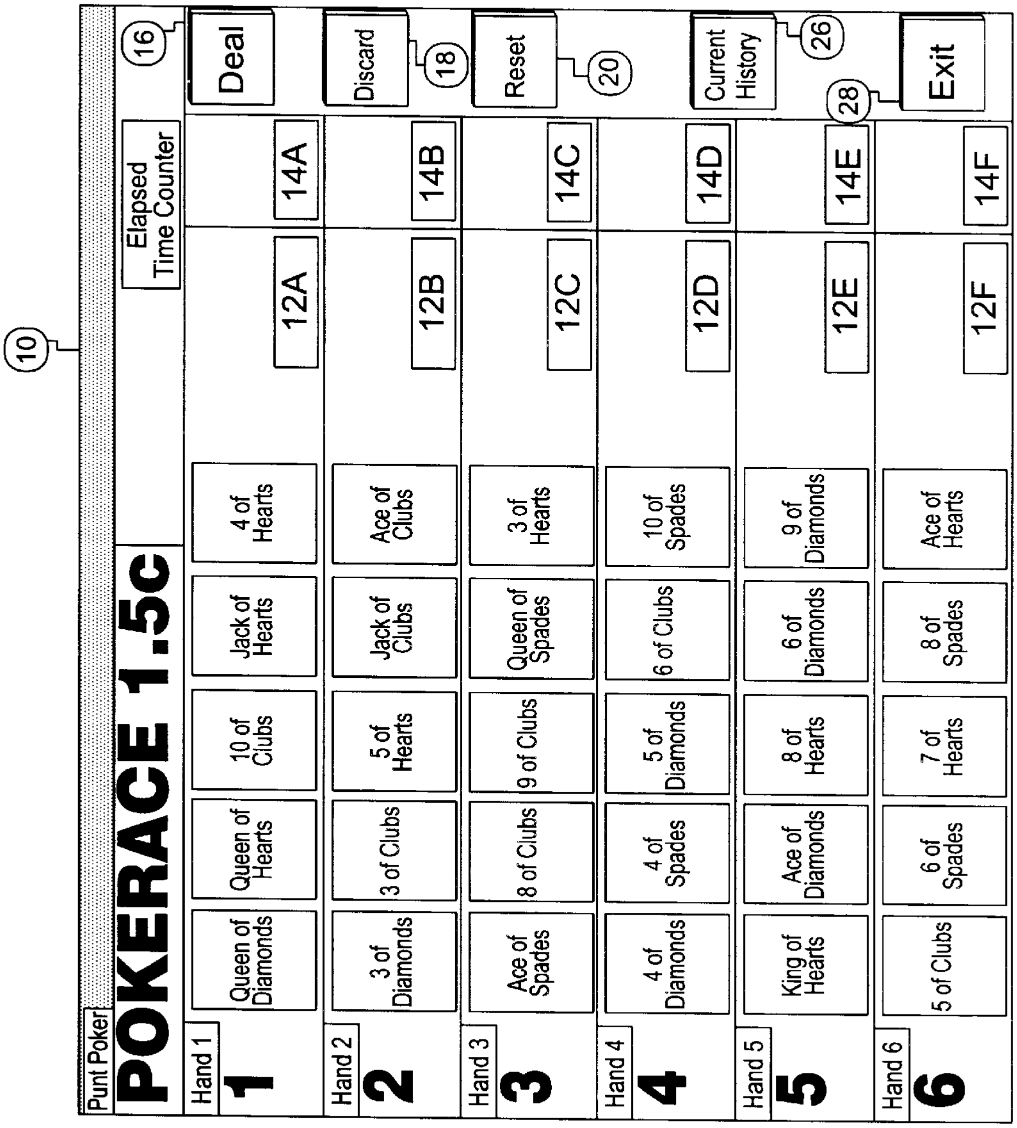

The player or game facilitator then selects the Deal icon 18 and a new set of cards are then displayed on the screen as shown in FIG. 4. After which, the game facilitator then selects the Discard icon 18 which discards the unwanted cards in accordance with the discarding criteria which will be described below and a new hand of cards is then shown in FIG. 6.

The players of the game are able to make further wagers on each of the hands according to the new odds calculated and shown in the betting odd value region 14. Again, the players wagers can be input via a keyboard (not shown) connected to the computer, and this information is then stored within the memory of the computer as described above.

Figure 8:
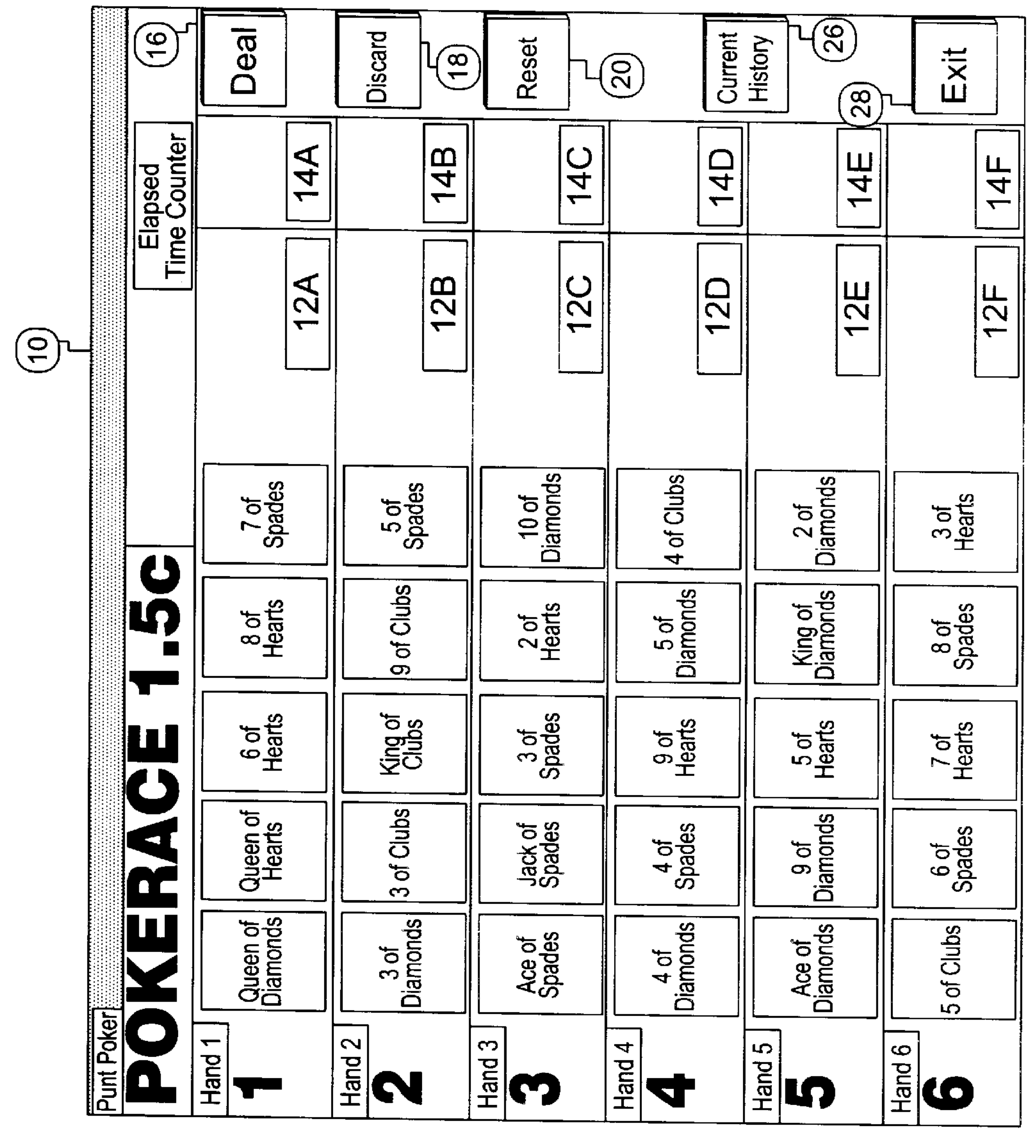
Figure 9:
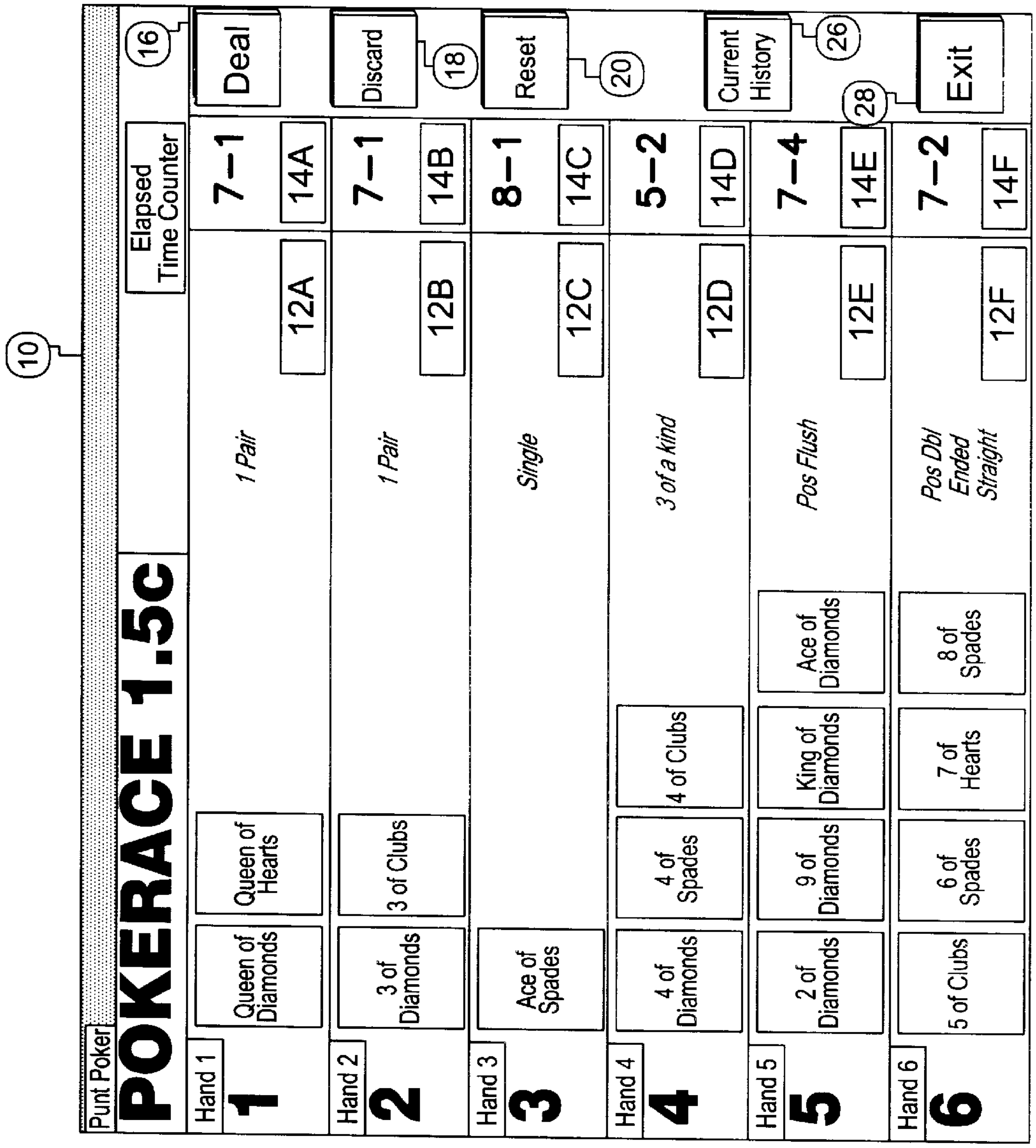

The method described above is then repeated as shown in FIG. 8, in which new cards are dealt when the Deal icon 16 is selected by a player or game facilitator. The Discard icon 18 is then selected and a new result of cards is shown in FIG. 9.

Figure 11:
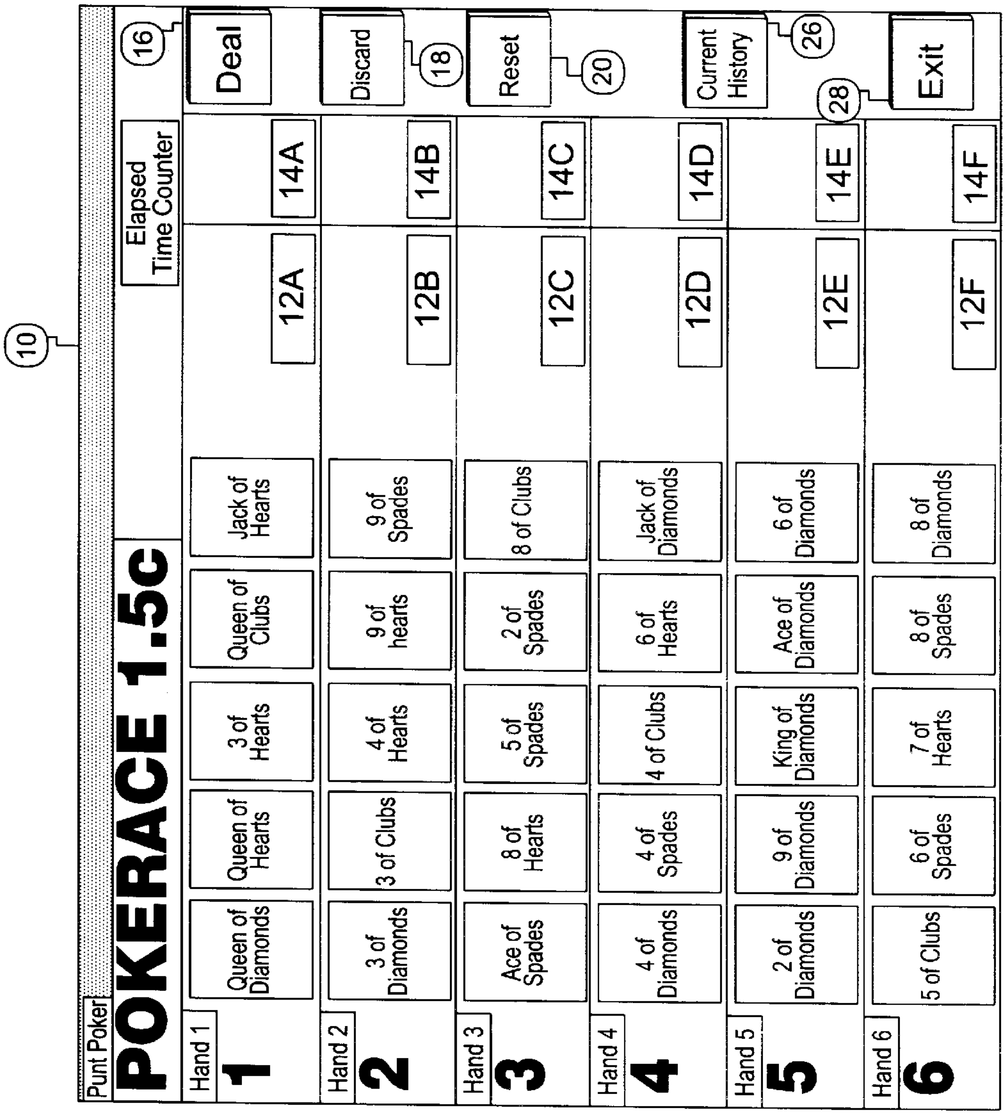
Figure 12:
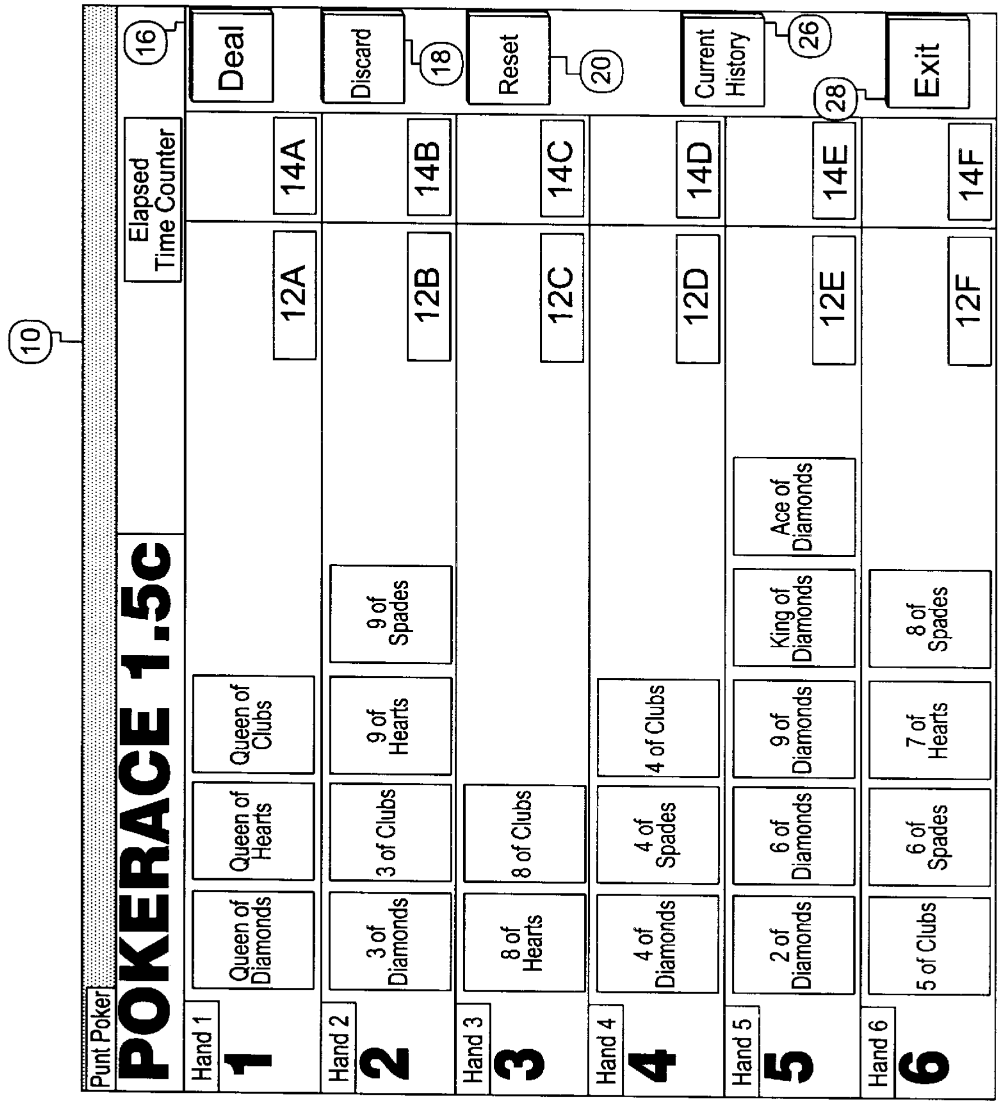

Again, the method is repeated and a new set of cards is generated as shown in FIG. 11 after which the Discard icon 18 is selected and the remaining cards (together with the betting odd values), are shown in FIG. 12.

However, it will be seen in FIG. 12 that the odds in the betting odd value region is not shown as the game has finished as there has been a winning hand shown in hand 5 which shows five cards of the same suit, namely diamonds and a flush has resulted. Therefore, hand5 has reached the requisite level of quality defined for the game.

Those players which have placed a wager on hand 5 at any stage of the game, shall be paid a "win" according to the calculated betting odd value at the time they placed a wager.

Figure 6:
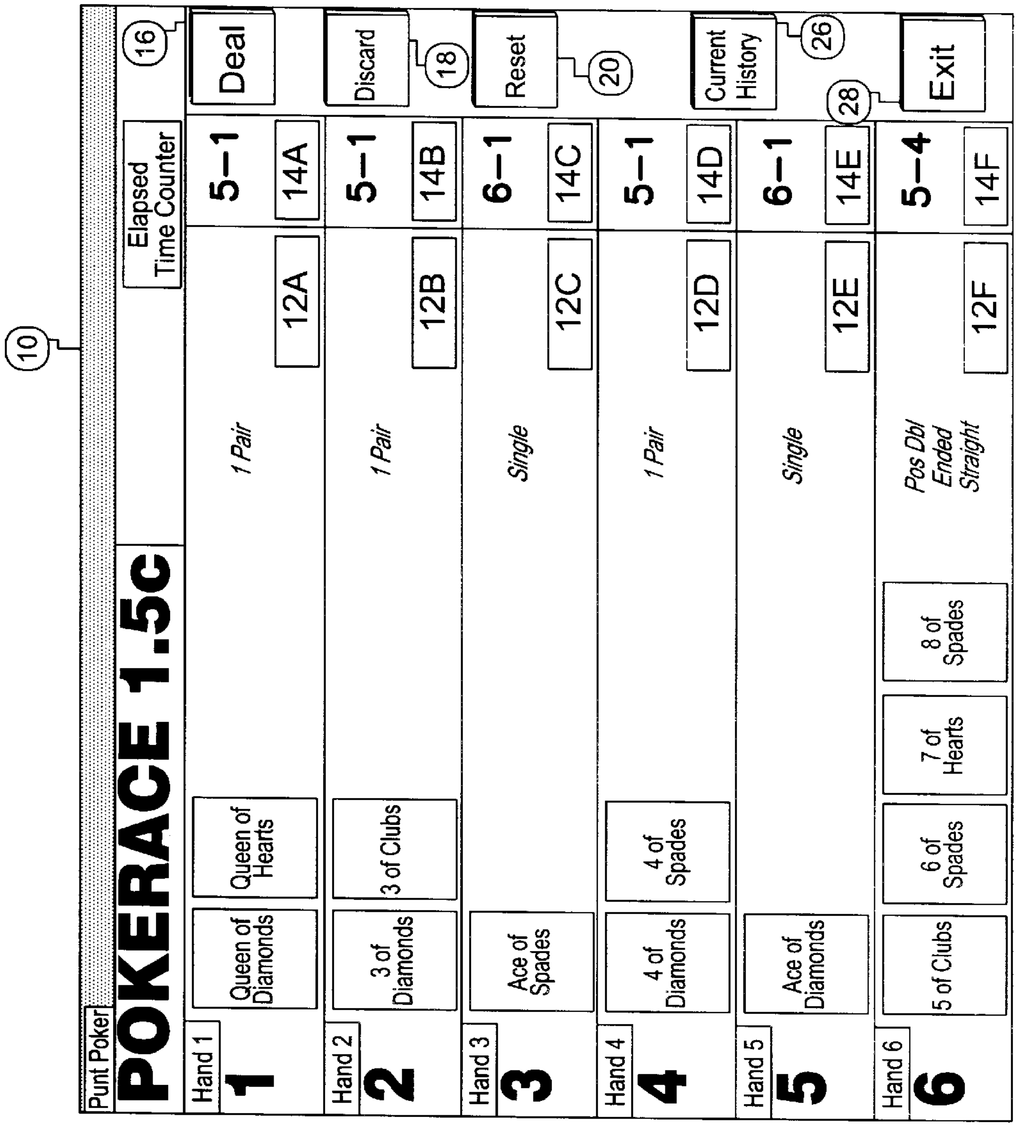

As the winning hand is hand, any player's wager which has been placed on hand 5 during the game, will then be paid out according to the odds shown in FIGS. 3, 6 and 9, at the stage of the game at which they made their wager. Hence, it is possible for a number of wagers to be placed for each of the hands.

The particular calculations used for this embodiment of the game will now be described.

FIGS. 5, 7, and 10 show tables of values for each hand drawn in FIGS. 3, 6 and 9 respectively.

For an explanation of how these values are calculated, reference is made to the values calculated in FIG. 5, hand 1.

Hand1 has one pair (being a pair of Queens). When the Deal icon 16 is selected, there shall be three cards dealt to hand1 and this is defined in the table of FIG. 5 under the column "shots", which equals '3'.

The availability of having another pair of Queens is defined as "avail" and is equal to '2', this being Queen of spades or Queen of Clubs which are to be placed back in the deck of cards once the cards have been discarded from the step of FIG. 4.

Next a weighted "formula" is calculated, being an estimated weighted value of availability, that of cards that remain in the of deck cards. The formula value is calculated from the following equation:

$$Formula = shots \times avail \times 4 = 3 \times 2 \times 4 = 24$$

The "4" in the above equation is a scaling factor which has been estimated.

Next the "bonus", "penalty' and "score" values are calculated from a table of values shown in Table 1 below.

TABLE 1

Bonus & Penalty Values

| Single | | 1 Pair | |
|---|---|---|---|
| Avail of Three = | No Action | Avail of Two = | No Bonus |
| Avail of Two = | Bonus 10 | Avail of One = | Bonus 4 |
| Avail of One = | Bonus 21 | Avail of None = | Bonus 17 |
| Avail of None = | Bonus 33 | 3 of a Kind | |
| Two Pairs | | Avail of One = | No Action |
| Avail of Four = | Bonus 50 | Avail of None = | Penalty 25 |
| Avail of Three = | Bonus 29 | Double Ended Straight | |
| Avail of Two = | Bonus 6 | Avail of Eight = | Bonus 127 |
| Avail of One = | Penalty 4 | Avail of Seven = | Bonus 105 |
| Avail of None = | Penalty 45 | Avail of Six = | Bonus 83 |
| Inside Straight | | Avail of Five = | Bonus 61 |
| Avail of Four = | Bonus 15 | Avail of Four = | Bonus 38 |
| Avail of Three = | Bonus 8 | Avail of Three = | Bonus 13 |
| Avail of Two = | No Bonus | Avail of Two = | No Bonus |
| Avail of One = | Penalty 15 | Avail of One = | Penalty 25 |
| Avail of None = | Penalty 25 | Avail of None = | Penalty 35 |
| Flush/Double Ended Straight Flush | | | |
| AvailSeventeen = | Bon325 | | |
| AvailSixteen = | Bon303 | | |
| AvailFifteen = | Bon282 | | |
| AvailFourteen = | Bon259 | | |
| AvailThirteen = | Bon237 | | |
| AvailTwelve = | Bon215 | | |
| AvailEleven = | Bon193 | | |
| AvailTen = | Bon171 | | |
| AvailNine = | Bon149 | | |
| AvailEight = | Bon127 | | |
| AvailSeven = | Bon105 | | |
| AvailSix = | Bon83 | | |
| AvailFive = | Bon61 | | |
| AvailFour = | Bon38 | | |
| AvailThree = | Bon13 | | |
| AvailTwo = | No Bon | | |
| AvailOne = | Pen25 | | |
| AvailNone = | Pen35 | | |

From the values assigned for each of the hands, the "chances" value for each hand is calculated according to the following formula:

Chances=Formula+Bonus+Score−Penalty

Calculating the value of the "chances" for hand1 is as follows:

$$Chances_{hand1} = 24 + 0 + 30 - 0 = 54$$

Next the rating for hand1 is calculated according to the following formula:

$$Rating_{hand1} = Chances_{hand1} / (total\ number\ of\ available\ cards\ in\ deck) = 54/40 = 1.35$$

Next after the rating has been calculated for each of the hands the total rating is calculated by summing each of the ratings for each hand 1 to 6:

$$Rating_{total} = Rating_{hand1} + Rating_{hand2} + Rating_{hand3} + Rating_{hand4} + Rating_{hand5} + Rating_{hand6} = 1.35 + 1.35 + 1.35 + 1.325 + 1.35 + 1.325 + 3.725 = 10.425$$

Now the odds are calculated according to the following formula:

$$Odds_{hand1} = (Rating_{hand1} / Rating_{total}) \times 100 \times 1.25 = 1.35 / 10.425 \times 100 \times 1.25 = 16.2 \text{ (as a percentage)}$$

Rounding this to a betting ratio is:

The 1.25 is a factor which has been added into the calculations to give the game facilitator a "market" which is really a buffer factor to ensure that a positive return is given to the game facilitator during the game.

It should be realised that although the above calculations have been calculated according to waiting factors and have been derived from an iterative process by the inventor of the present invention, calculation of the betting odd value may be calculated statistically.

Figure 13:
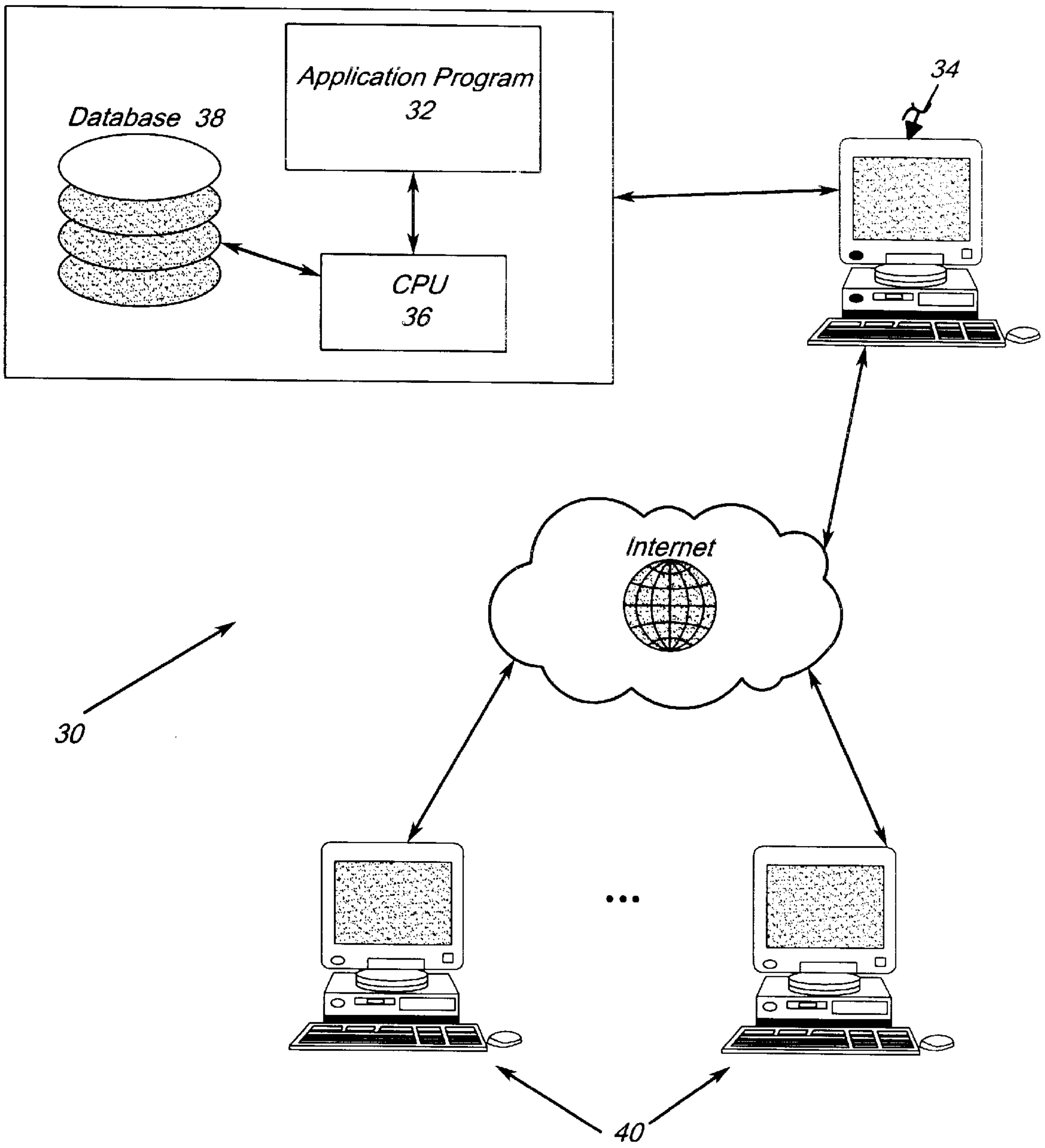
FIG. 13 illustrates a system for generating the screen displays of FIGS. 1–4, 6, 8–9 and 11–12.

Referring now to FIG. 13, there is shown a schematic illustration an Internet-based system 30 for implementing the embodiment described above. In this system, the computer 34 has a CPU 36 for processing data, a Database 38 for storage of information and the Application program 32 which has the software to drive the embodiment described above.

The data display shown in FIGS. 1–4, 6, 8–9, and 11–12 is stored on the computer 34 in a HTML format and is accessible from an Internet web browser. The computer 34 is connected via the Internet to a plurality of clier computers 40 which can download the HTML data for FIGS. 1–4, 6, 8–9, and 11–12 and display them on their Internet browser located on their computer 40.

Any number of game players may log on to a web site operated by the game facilitator who operates computer 34. The client computer 40 users can make their wagers electronically through a credit card payment system via the.

Figure 14:
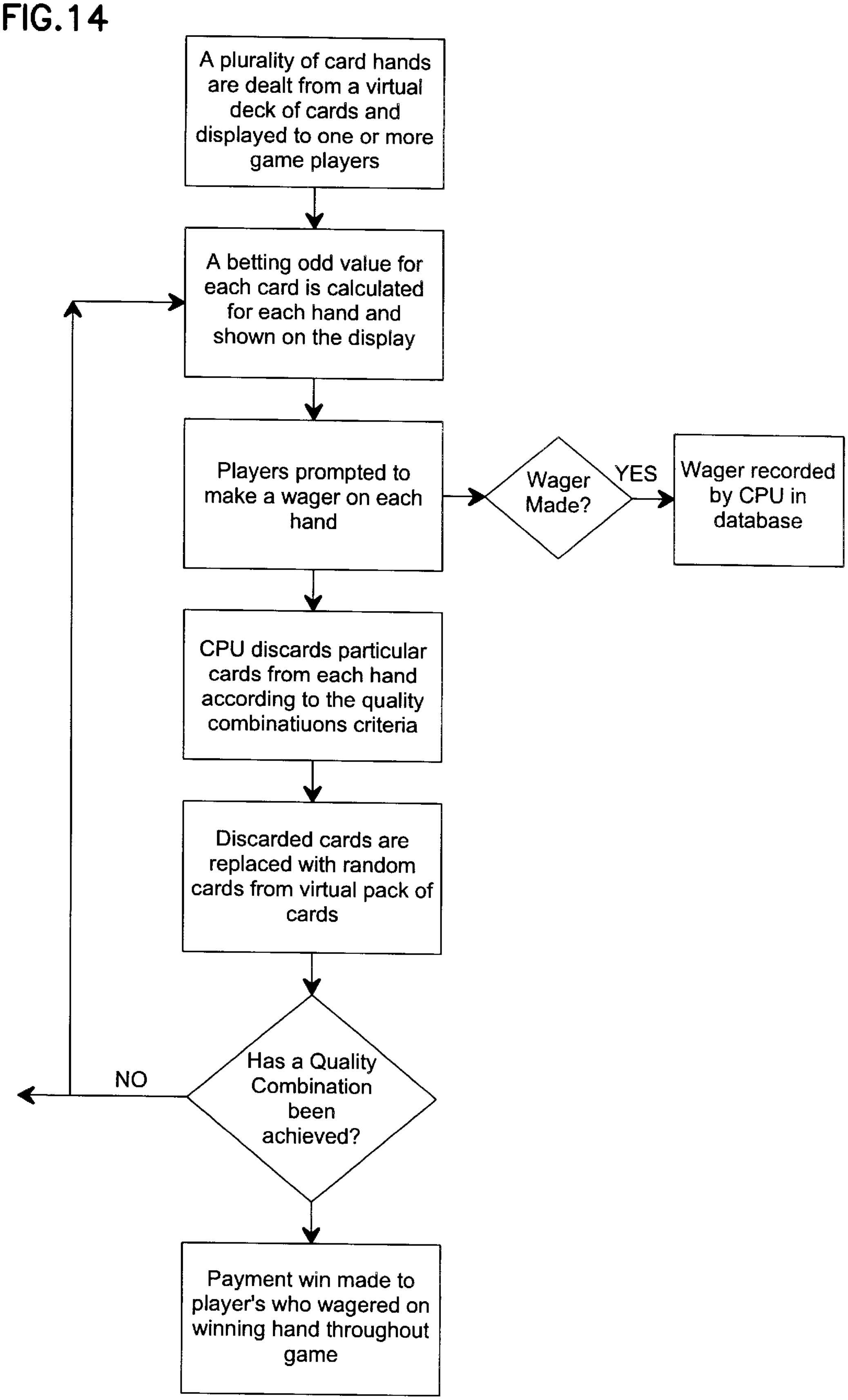
FIG. 14 is an illustration of the steps involved in implementing the system of FIG. 13.

FIG. 14 is a schematic illustration of the steps involved in implementing the method for the embodiment described above and implemented on the system 30.

Additionally, it should be realised that the invention may be embodied in a device other than a personal computer, such as in a gaming machine (ie a pokie machine).

In yet another embodiment of the invention, the game facilitator may be an employee of a casino and the hands are shown on a monitor to a group of players. The players would place their bets on a betting table which has areas marked thereon which represent each of the hands on which the players could place their bets. Such embodiments will be apparent to those skilled in the art.

An advantage of the embodiment is that any number of players can place a wager on a selection of hands during each "deal" of cards which is made during the game. Hence, this provides the player with a skill component in estimating which hand is the likely hand to win the game. The game may also be provide an enjoyable and challenging experience to certain players.

It would be appreciated by a person skilled in the art that numerous variations and/or modifications may be made to the present invention as shown in the specific embodiments without departing from the spirit or scope of the invention as broadly described. The present embodiments are therefore, to be considered in all respects to be illustrative and not restrictive.

What is claimed is:

1. A method of playing a card game on a computer with one or more players, the method comprising:

(A) providing a central processing unit programmed to perform the following steps:

(i) define a virtual deck of cards;

(ii) set up a series of quality combinations according to a predefined set of game criteria which a given hand must achieve in order to win, each hand comprising a predetermined number of cards;

(iii) deal from the deck, a plurality of hands of cards;

(iv) determine whether any hand has achieved a quality combination, and, if not, assessing for each hand which cards in that hand best assist the hand in achieving one or more of said quality combinations;

(v) discard from each hand, the cards which do not assist in achieving one of the said quality combinations;

(vi) establish a betting value for each hand based on the likelihood of that hand achieving a said quality combination when the discarded cards are placed with the new cards from the deck;

(vii) replace the discarded cards for each hand;

(B) providing at least one display device connected to the central processing unit for displaying the plurality of hands to one or more of the players;

wherein the steps (iii) to (vii) are repeated by the central processing unit until at least one hand achieves a quality combination.

2. A method as claimed in claim 1, wherein the method includes a further step of:

(viii) providing a bet input means connected to the central processing unit, for allowing the players to input a bet based on the betting value of one or more of the hands.

3. A method as claimed in claim 2, wherein the method includes the further step of:

(ix) payment of a win based on the betting value to those players which bet on the hand which achieves the highest value of these hands which achieve a quality combination, and in which the bets for the other hands are collected from the players.

4. A method as claimed in claim 2, wherein the bet input means is a display board having areas marked thereon, which represent each of the hands and on which a value of money can be placed.

5. A method as claimed in claim 3, wherein a win based on the betting value is paid to those players which bet on the hand which achieves a highest value of the plurality of hands based upon the quality combinations.

6. A method as claimed in claim 5, wherein the bets for the other hands are collected from the other players and paid to the winning hand.

7. An apparatus for playing a virtual card game with one or more players, the apparatus including:

(A) a central processing unit having;

(i) means to define a virtual deck of cards;

(ii) means to set up a series of quality combinations according to a predefined set of game criteria which a given hand must achieve in order to win, each hand comprising a predetermined number of cards;

(iii) means to deal from the deck, a plurality of hands of cards;

(iv) means to determine whether any hand has achieved a quality combination, and if not, assessing for each hand, which cards in that hand, best assist the hand in achieving one or more of said quality combinations;

(v) means to discard from each hand, the cards which do not assist in achieving one of the said quality combinations;

(vi) means to establish a betting value for each hand based on the likelihood of that hand achieving a said quality combination when the discarded cards are replaced with new cards from the deck;

(vii) means to replace the discarded cards for each hand;

(B) at least one display device connected to the central processing unit for displaying the plurality of hands to one or more of the players;

wherein, the means (iii) to (vii) are repeated by the central processing unit until at least one hand achieves a quality combination.

8. An apparatus as claimed in claim 7, wherein the apparatus includes a bet input means connected to the central processing unit to allow the players to input a bet based on the betting value of one or more of the hands.

9. An apparatus as claimed in claim 8, wherein a win based on the betting value is paid to those players which bet on the hand which achieves the highest value of the plurality hands which achieve a quality combination.

10. An apparatus as claimed in claim 9, wherein the bets for the other hands are collected from the players and paid to the wining hand.

11. An apparatus as claimed in claim 7, wherein said players view the plurality of hands from their own display device.

12. An apparatus as claimed in claim 11, wherein each player's display device is connected by a client computer which can access the central processing unit via a computer network.

13. An apparatus as claimed in claim 12, wherein the computer network is the Internet.

14. An apparatus as claimed in claim 7, wherein said display device is located on a gaming machine.

15. An apparatus as claimed in claim 7, wherein the discarded cards are returned to the deck prior to the deck betting value for each hand being established.

16. An apparatus as claimed in claim 7, wherein the cards in the deck are randomised prior to cards being drawn from the deck at any stage.

17. An apparatus as claimed in claim 7, wherein payment of the winning hand is calculated by multiplying the bet by the betting value.

18. An apparatus as claimed in claim 7, wherein the bets collected for the hands which do not win are kept by a game facilitator.

19. An apparatus as claimed in claim 7, wherein when no bets are made by a player for the winning hand, then all bets are kept by the game facilitator.

20. An apparatus as claimed in claim 7, wherein the deck of cards consists of a visual representation of a pack of 52 playing cards of the type 2,3,4,5,6,7,8,9,10, Jack, Queen, King, and Ace and being of the following suites: spades, clubs, diamonds and hearts.

21. An apparatus as claimed in claim 7, wherein the quality combinations for a particular hand includes any one of the following:

(1) any five cards in sequence and defined as a "straight"

(2) any five cards of the same suit and defined as a "flush"

(3) any five cards sequence of the same suit and defined as a "straight flush"

(4) three cards of the same kind and a pair and defined as a "full house"

(5) four cards of the same kind and defined as "four of a kind".

22. An apparatus as claimed in claim 7, wherein there are 2 to 8 hands for which a selection of virtual cards is made at (iii).

23. An apparatus as claimed in claim 7, wherein there are 6 hands for which a random selection of virtual cards is made at (iii).

24. An apparatus as claimed in claim 7, wherein each hand consists of five playing cards.

25. An apparatus as claimed in claim 7, wherein the display device is a mobile phone utilising a mobile phone browser which displays information generated by the central processing unit.

26. An apparatus as claimed in claim 7, wherein the display device is a PDA screen which displays data generated by the central processing unit.

27. An apparatus as claimed in claim 8, wherein the bet input means is a button located on the cover of a gaming machine which represents a value of a bet.

* * * * *